United States Patent [19]

Kline et al.

[11] Patent Number: 4,523,713
[45] Date of Patent: Jun. 18, 1985

[54] THERMALLY ACTUATED DIFFUSER

[75] Inventors: James R. Kline, Moraga; Peter Brand, San Francisco, both of Calif.

[73] Assignee: Acutherm, Ltd., Emeryville, Calif.

[21] Appl. No.: 459,468

[22] Filed: Jan. 20, 1983

[51] Int. Cl.³ .............................................. F24F 13/16
[52] U.S. Cl. ...................................... 236/1 C; 236/49
[58] Field of Search ............... 236/49, 1 C; 98/40 VT

[56] References Cited

U.S. PATENT DOCUMENTS

3,743,180  7/1973  Perkins et al. ...................... 236/1 C
4,231,513  11/1980  Vance et al. ........................... 236/49
4,238,071  12/1980  Post ........................................ 236/49

Primary Examiner—William E. Tapolcai
Attorney, Agent, or Firm—Manfred M. Warren; Robert B. Chickering; Glen R. Grunewald

[57] ABSTRACT

An improved thermally actuated diffuser is disclosed. The diffuser comprises three thermal sensor actuators. A first thermal sensor actuator is responsive to changes in the room air temperature and is engaged when cool air is supplied through the duct into the room. A third thermal sensor actuator is responsive to changes in the room air temperature and is engaged when warm air is supplied to the room. A second thermal sensor actuator is responsive to changes in the duct air temperature and brings either the first or second thermal sensor actuator into engagement with the diffuser when the appropriate temperature of air is supplied through the duct and disengages the thermal actuator not being used with that duct air temperature.

14 Claims, 13 Drawing Figures

FIG_3_

FIG_4_     FIG_5_

FIG_10_

FIG_11_

CLOSED    OPEN

FIG_12_

CLOSED   OPEN

FIG_13_

4,523,713

THERMALLY ACTUATED DIFFUSER

DESCRIPTION

1. Technical Field

The present invention relates to an improved thermally actuated diffuser and, more particularly, to a diffuser unit for delivering a variable, modulated volume of air to a room or other space in response to changes in the temperature of the air in that room or other space.

2. Background Art

Thermally actuated diffuser in which conditioned air is delivered to a room or other space is wellknown in the art. U.S. Pat. No. 4,231,513, issued on Nov. 4, 1980 and re-issued June 1, 1982 (Re. No. 30,953), discloses a diffuser which delivers a modulated, variable volume of conditioned air to a room or other space in the building.

An integrated sensor actuator which both senses temperature changes in the room and also provides the actuating force for varying the amount of air flow into the room in response to the sensed temperature is disclosed in said patent. In addition, that reference teaches a second integrated sensor actuator that measures the temperature of the duct air and provides the actuating force to convert the operation of the diffuser from one mode, i.e., delivery of cool air into the room, to a second mode, i.e., delivery of warm air into the room, during a period called changeover. In the changeover period, such as during morning warm-up, the room is brought up to the desired temperature after the air temperature in the room had been permitted to fall substantially below the desired temperature such as during a weekend when the room is not being used. Typically, hot air is blown through the branch duct only for a limited short period of time, usually about half an hour, just shortly before the start on normal working hours on a Monday morning. Thereafter, cool air is delivered through the duct and the operation of the diffuser returns to the modulation of that cool air.

SUMMARY OF THE INVENTION

In the diffuser of the present invention, in one particular embodiment, the diffuser comprises a first sensor actuator means which is responsive to a first room air temperature, and is for modulating the flow control means when air of one temperature is supplied through the duct. A second sensor actuator means is responsive to the duct air temperature and is for disassociating the first sensor actuator means with flow control means when air of another temperature is supplied through the duct. A third sensor actuator means is responsive to a second room air temperature and is operatively associated with the flow control means for modulating flow control means when air of said another temperature is supplied through the duct.

In another embodiment of the present invention, a diffuser comprises a flow control means for varying the size of an opening in the diffuser to regulate the volume flow of the air from the duct into the room. A first sensor actuator means is responsive to a first room air temperature and is operatively associated with the flow control means for modulating the flow control means in response to changes in the room temperature when air of one temperature is supplied through the duct. A third sensor actuator means is also responsive to the room air temperature and is operatively associated with the flow control means for modulating the flow control means in response to changes in room temperature when air of another temperature is supplied through the duct. A second sensor actuator means is provided for associating the first sensor actuator means with the flow control means and for disassociating the third sensor actuator means with the flow control means when air of one temperature is supplied through the duct. The second sensor actuator means also associates the third sensor actuator means with the flow control means and disassociates the first sensor actuator means with the flow control means when air of another temperature is supplied through the duct.

In yet another embodiment of the present invention, the diffuser of the present invention comprises a flow control means for varying the size of an opening in the diffuser to regulate the volume flow of air from the duct through the diffuser and into the room. A first sensor actuator means is responsive to a first room air temperature and is operatively associated with the flow control means for modulating the flow control means in a normally closed to open mode of operation in response to changes in room air temperature when air of one temperature is supplied through the duct. A second sensor actuator means is responsive to duct air temperature and is operatively associated with the flow control means for moving the flow control means to an open position in response to air of another temperature in the duct. The another temperature is warmer than the one temperature. The second sensor actuator means disassociates the first sensor actuator means with the flow control means in response to air of another temperature in the duct. The third sensor actuator means is responsive to a second room air temperature and is operatively associated with the flow control means for modulating the flow control means from a normally open to closed mode of operation in response to changes in room air temperature when air of another temperature is supplied through the duct.

BRIEF DESCRIPTION OF DRAWINGS

FIG. 1 is a bottom plan view of a part of a modular ceiling showing a thermally actuated diffuser of the present invention. In FIG. 1, part of the appearance plate has been broken away to show details of the diffuser plate, the louvers (or vanes), at the edges of the diffuser plate, the thermal sensor actuators, the louver control disc, and the linkage rod extending from the louver control disc to the louvers.

DETAILED DESCRIPTION OF THE DRAWINGS

Figure 1:
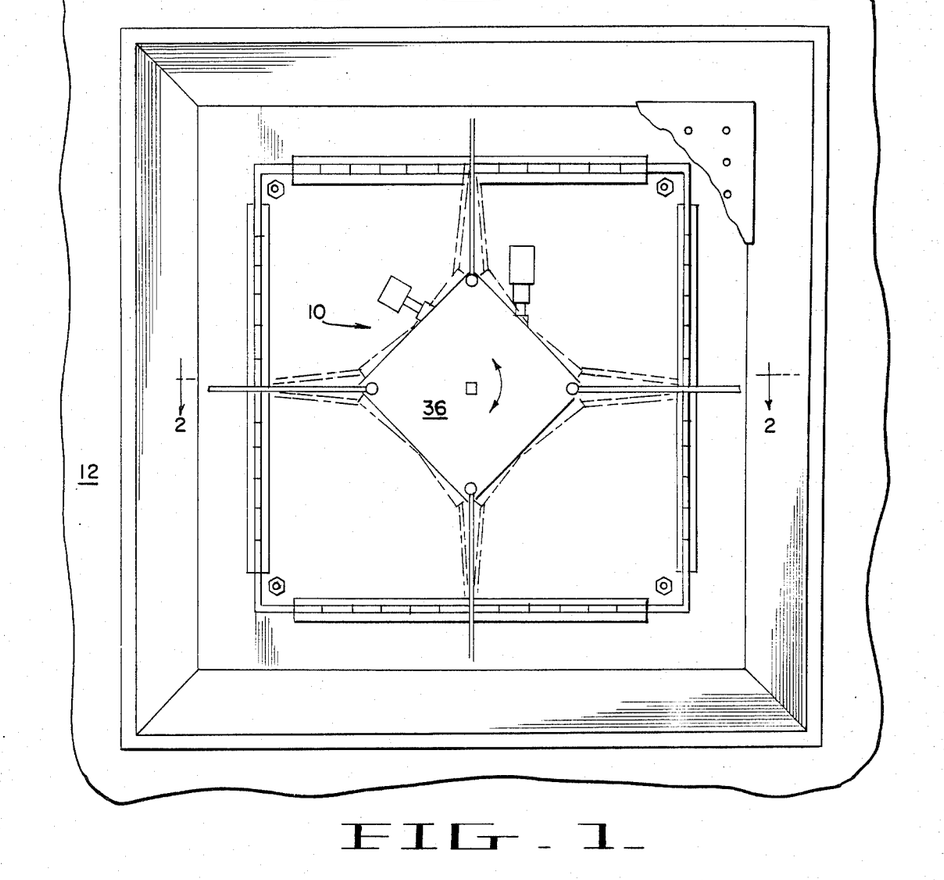

A thermally actuated, variable air volume diffuser of the present invention is indicated generally by the reference numeral 10 in FIG. 1. FIG. 1 is a bottom plan view looking upwardly at a room ceiling. The ceiling, as illustrated in FIG. 1, is a modular ceiling comprising a number of individual modules 12. The diffuser 10 of the present invention is installed in the ceiling in the place of one of the modules 12. The diffuser 10 distributes a variable volume of air to the room, or other space from a branch duct 20, and the amount of air flowing through the diffuser 10 is modulated in response to changes in the temperature of the air in the room, as will be described in detail below.

The diffuser 10 comprises a diffuser can 14, an appearance plate 16, and a diffuser plate 18. The diffuser plate 18 serves both as a plate for directing the air flow, as well as a support structure for the operative component for the diffuser. The air from the branch duct 20 (shown by arrow A) flows from the branch duct 20 and is deflected by the diffuser plate 18 outwardly to the periphery 22 of the diffuser plate 18 for subsequent flow down along the inner surfaces 22 of the related, inclined sidewalls of the can 14.

This flow of air induces a certain amount of room air up through the appearance plate 16 (shown by arrow B). This induced room air flows over the thermal sensor actuator assembly 30 to be described in greater detail. The air leaving the periphery 22 of the diffuser can 14 is directed at an angle with respect to the adjacent ceiling panels 12 so as to provide a maximum Coanda effect and to thereby cause the diffused air to hug the ceiling and to avoid dumping.

Figure 2:
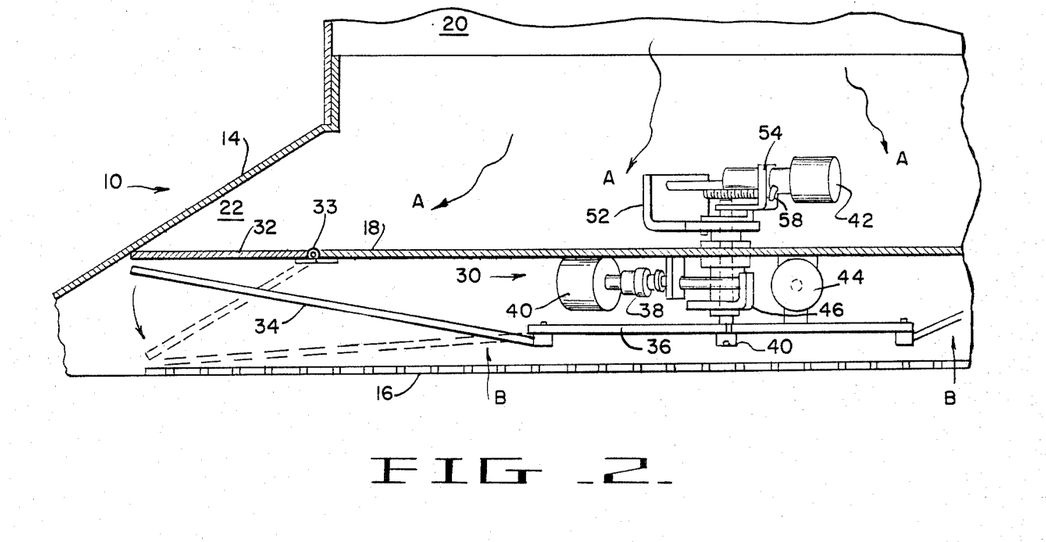
FIG. 2 is a side elevation view taken along the line and in the direction indicated by the arrows 2—2 in FIG. 1.

In the embodiment shown in FIG. 1, four louvers or vanes 32 are connected by hinges 33 to the diffuser plate 18. Each louver 32 is movable from a fully closed position (in which the outer edge of the louver engages the inside surface 22, as shown in FIG. 2) to a fully open position (as shown by the dotted line in FIG. 2). The control of the movement of each louver 32 being between the fully closed position and the fully open position and all intermediate positions is produced by a rod 34 and a louver control disc 36. The louver control disc 36 is, in turn, connected to a shaft 38 by a locking nut 40 for rotation with the shaft 38. The rotation of the disc 36 causes the modulation of the opening of the vanes 32.

Figure 3:
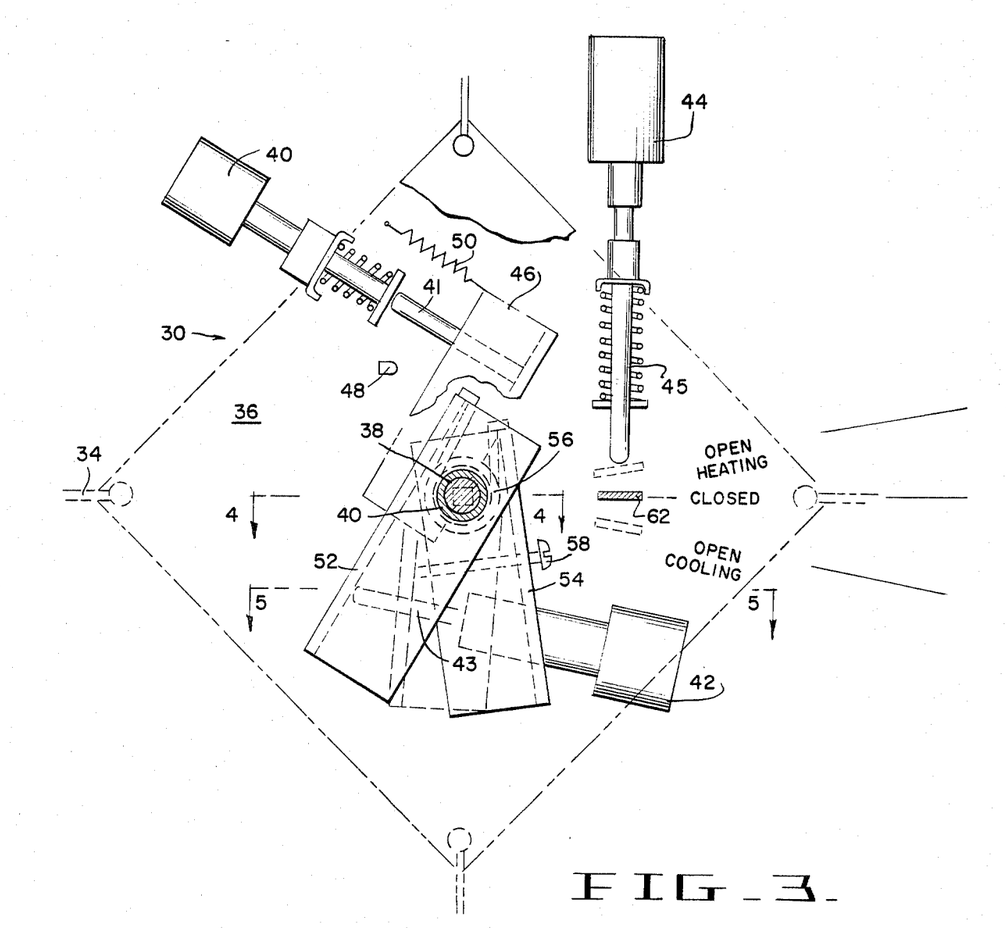
FIG. 3 is a plan view of a portion of the diffuser of the present invention showing the thermal sensor actuators.
Figure 4:
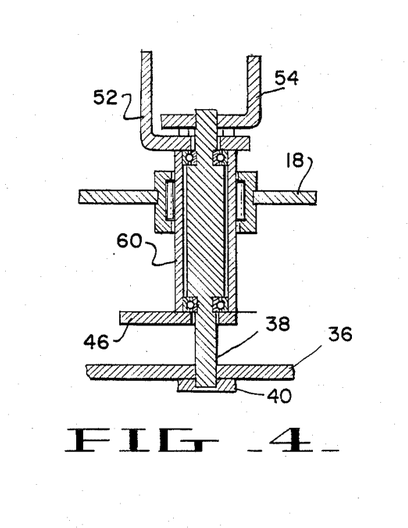
FIG. 4 is a cross-sectional view taken along the line 4—4 of FIG. 3.
Figure 5:
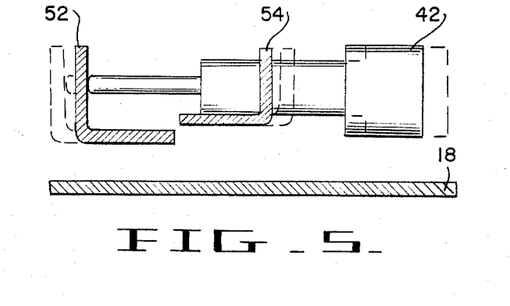
FIG. 5 is a cross-sectional view taken along the line 5—5 of FIG. 3.

Referring to FIG. 3, there is shown in greater detail the thermal assembly 30 of the diffuser 10 of the present invention. A first thermal sensor actuator 40 is located to one side of the diffuser plate 18. A second thermal sensor actuator 42 is located to the other side of the diffuser plate 18. A third thermal sensor actuator 44 is located to the one side of the diffuser plate 18, on the same side as the first thermal sensor actuator 40. The first thermal sensor actuator 40, the second thermal sensor actuator 42, and the third thermal sensor actuator 44 can be of the type commonly used in automotive applications and are distributed by Robertshaw Controls Co. (Fulton Sylphon Division).

The first thermal sensor actuator 40 has a shaft 41 which is aligned to actuate a first member 46, moving it away from stop 48, which is affixed to the diffuser plate 18. The first member 46 is normally biased to rest against stop 48 by a first spring 50. On the other side of the diffuser plate 18 is a second member 52 and a third member 54. The first member 46 is connected to the second member 52 through the outer sleeve 60 of the center shaft 38. A second torsion spring 56 closes the angular distance between the second and the third members 52 and 54, respectively. The second member 52 is brought to a stop against an adjusting screw 58 in the third member 54. The third member 54 is connected directly to the control disc 36 by the shaft 38. The second thermal sensor actuator 42 is mounted on the third member 54. The control disc 36 has a tab 62. When the disc 36 is in the position designated as "Open Heating," the shaft 45 of the third thermal sensor actuator 44 is positioned to actuate the tab 62. The operation of the diffuser 10 is as follows.

COOLING MODE

In this mode of operation, cool air is supplied from the branch duct 20. Since cool air is supplied into the room, the second thermal sensor actuator 42 being cooled would be fully retracted. The angular distance between the second and the third members 52 and 54, respectively, is at a minimum, i.e., the second member 52 being at a full stop against the adjusting screw 58. Since the room is cool, the first thermal sensor actuator 40 would also be fully retracted. The first member 46 would be retracted by the first spring 50 coming to rest against the stop 48. Since the third member 54 is directly connected to the control disc 36 through the center shaft 38, the control disc is in the "Closed" position. The damper blades 32 would be closed.

As the room begins to warm up, due to changing load conditions the first thermal sensor actuator 40 begins to expand. The shaft 41 pushes the first member 46 away from the fixed stop 48. The first member 46 transmits its rotational motion via the outer sleeve 60 of the center shaft 38. The rotation of the outer sleeve 60 causes the second member 52 to rotate. This rotational motion is transmitted to the third member 54 by the second torsion spring 56. The rotation of the third member 54 is then transmitted through the center shaft 38 to the control disc 36. The disc is then moved to the "Open Cooling" position. This opens the louvers 32 to a position whereby cool air is supplied to the room.

When the demand for cool air in the room is satisfied, the first thermal sensor actuator 40 will retract its shaft 41. The above-described motions will reverse until the control disc 36 is again at the "Closed" position. This then closes the louvers 32.

HEATING MODE

In the heating mode, warm air is supplied through the branch duct 20. The warm air heats the second thermal sensor actuator 42. The expansion of the shaft 43 of the second thermal sensor actuator 42 pushes the second member 52 away from the third member 54 against the force of the second torsion spring 56. Since the first member 46, which is connected to the second member 52 by the outer sleeve 60, is biased at rest against the stop 48 by the first spring 50, the movement of the third member 54 away from the second member 52 results in a rotation of the center shaft 38. This causes the control disc 36 to be moved in a counter clockwise direction to the "Open Heating" position. The rotation of the disc 36 continues until the tab 62 on the control disc 36 comes to a stop against the shaft 45 of the third thermal sensor actuator 44. As warm air continues to be supplied through the duct 20, the second thermal sensor actuator 42 continues to expand pushing the second member 52 away from the third member 54. Since the control disc 36, with the tab 62 is engaged with the shaft 45 of the third thermal sensor actuator 44 and cannot be moved any further, further expansion of the second thermal sensor actuator 42 results in the first member 46 being pushed away from the stop 48, against the force of spring 50. This causes the disengagement of the first member 46 from the shaft 41 of the thermal first sensor actuator 40.

Since the diffuser 10 is now in the "Open Heating" position, warm air is supplied to the room. As the room temperature warms, but before it is satisfied, the first thermal sensor actuator 40, being a lower temperature sensitive thermostat, begins to expand. However, since the first member 46 is disengaged from the shaft 41 of the first thermal sensor actuator 40, the expansion of the first thermal sensor actuator 40 has no effect on the diffuser 10.

As the demand of the room temperature nears the temperature set point of the third thermal sensor actuator 44, the shaft 45 of the third thermal sensor actuator 44 begins to expand. The third thermal sensor actuator 44 pushes against the tab 62 and moves the control disc 36 from the "Open Heating" position to the "Closed" position.

In the event the room cools down, and further warm air is desired, the third sensor actuator 44 would retract. Since the second thermal sensor actuator 42 continues to be affected by the warm duct air, it continues to expand rotating the disc 36 until the tab 62 is against the shaft 45 of the third thermal sensor actuator 44.

SLOT DIFFUSER (LINEAR DIFFUSER)

Figure 9:
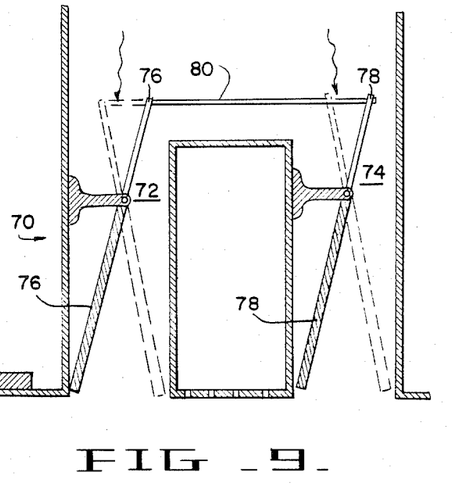
FIG. 9 is a side view of a slot diffuser which can be operated by the thermal assembly of FIGS. 6, 7 and 8.

Referring to FIG. 9, there is shown another diffuser 70 of the present invention. The diffuser 70 is of a type known as a "slot diffuser" or "linear diffuser". In the slot diffuser 70 of the present invention, two slots 72 and 74 are shown, each with a blade for modulating the amount of air flowing through the slot. A first blade 76 modulated the amount of air passing through the first slot 72, while a second blade 78 modulates the amount of air passing through the second slot 74. The first blade 76 and the second blade 78 are connected to move in tandem by a bar 80.

Figure 6:
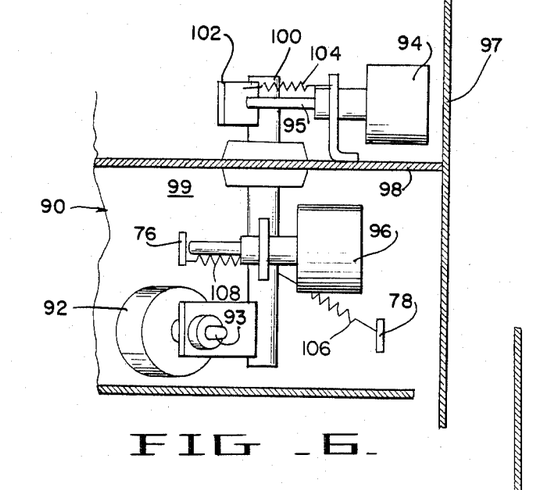
FIG. 6 is a top view of the thermal assembly portion of another diffuser of the present invention, showing the thermal sensor actuators.
Figure 7:
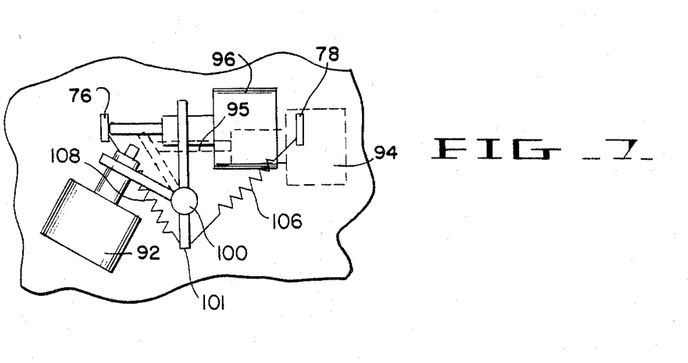
FIG. 7 is a side view of the apparatus shown in FIG. 6.
Figure 8:
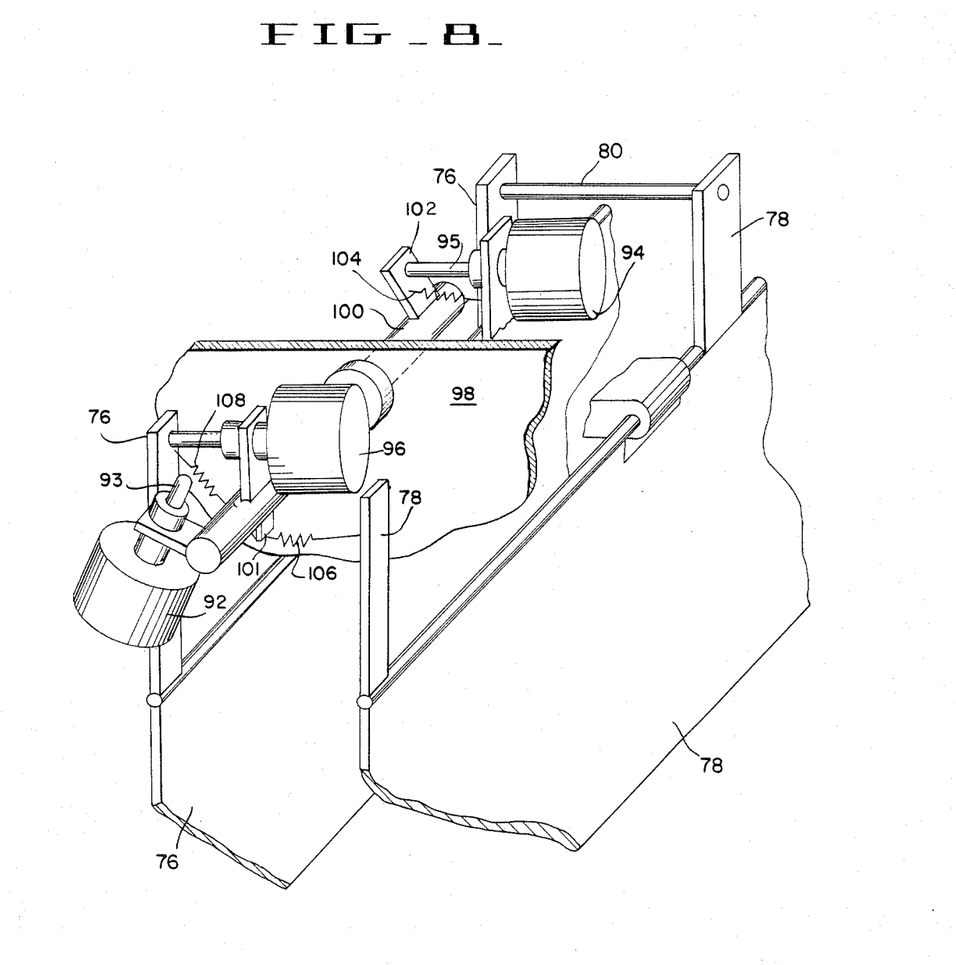
FIG. 8 is a perspective view of the apparatus shown in FIGS. 6 and 7.

The thermal assembly portion 90 of the diffuser 70 is shown by reference to FIGS. 6, 7 and 8. The thermal assembly portion 90 of the slot diffuser 70 of the present invention comprises a first thermal sensor actuator 92, a second thermal sensor actuator 94 and a third thermal sensor actuator 96. The thermal sensor actuators 92, 94 and 96 are of the type as previously described. The first and third thermal sensor actuators 92 and 96 are located in an induction chamber 99 to one end of the diffuser can 97 and are positioned to sense the temperature of the room air by means of room air being induced through the induction chamber 99. The second thermal sensor actuator 94 is located on the duct side of the plate 98 and is positioned to sense the temperature of the duct air. A single shaft 100 is mounted through the plate 98. Mounted on the shaft 100 to the one side of the plate 98, which faces the room and is adapted to receive the room air temperature, are first and third thermal sensor actuators 92 and 96.

The first and third thermosensor actuators 92 and 96 are mounted angularly spaced on the shaft 100. A first spring 106 connects a tab 101 on the shaft 100 with the second blade 78. A third spring 108 connects the tab 101 to the first blade 76.

Mounted on the shaft 100 to the other side of the plate 98, i.e., the side facing the duct air, is a tab 102. The second thermal sensor actuator 94 is aligned to impinge the tab 102. A second spring 104 keeps the tab 102 urged against the shaft 100 of the second thermal sensor actuator 94. The operation of the diffuser 70 will now be explained as follows:

COOLING MODE

In this mode of operation, cool air is supplied through the duct. The second thermal sensor actuator 94 is fully retracted. The second spring 104 brings the tab 102 back against the shaft 95 of the second thermal sensor actuator 94. This rotates the shaft 100, which, through the first spring 106 pulls the second blade 78 into the dotted position shown in FIG. 9. Since the first and second blades 76 and 78 are connected in tandem, the first blade 76 would also be brought to a closed position (as shown by the dotted lines). The slots 72 and 74 of the slot diffuser 70 are now in the closed position. The rotation of the shaft 100 also brings the first thermal sensor actuator 92 into position against the second blade 78. When the room air temperature warms up, the shaft 93 of the first thermal sensor actuator 92 begins to expand pushing the second blade 78 into the open position (shown by the solid lines in FIG. 9). This opens the slots 72 and 74 permitting cool air to enter into the room. When the room air temperature has been satisfied, the first thermal sensor actuator 92 retracts. The return force of the first spring 106 pulls the second blade 78 into the closed position.

HEATING MODE

In this mode of operation, warm air is supplied through the duct. The second thermal sensor actuator 94, in response to the warm air, expands. The shaft 95 pushes against the tab 102. This causes the shaft 100 to rotate. The rotation of the shaft 100 causes the first thermal sensor actuator 92 to disengage from the second blade 78. This relaxes the first spring 106. The rotation of the shaft 100 also brings the third thermal sensor actuator 96 into contact with the first blade 76. The third spring 108 pulls the first blade 76 into the open position. As the room air is warmed, bringing to the temperature set by the third thermal sensor actuator 96, the third thermal sensor actuator 96 begins to expand, pushing against the first blade 76 into the closed position (shown by the dotted line in FIG. 9). This then closes off further delivery of air from the duct into the room.

Figure 10:
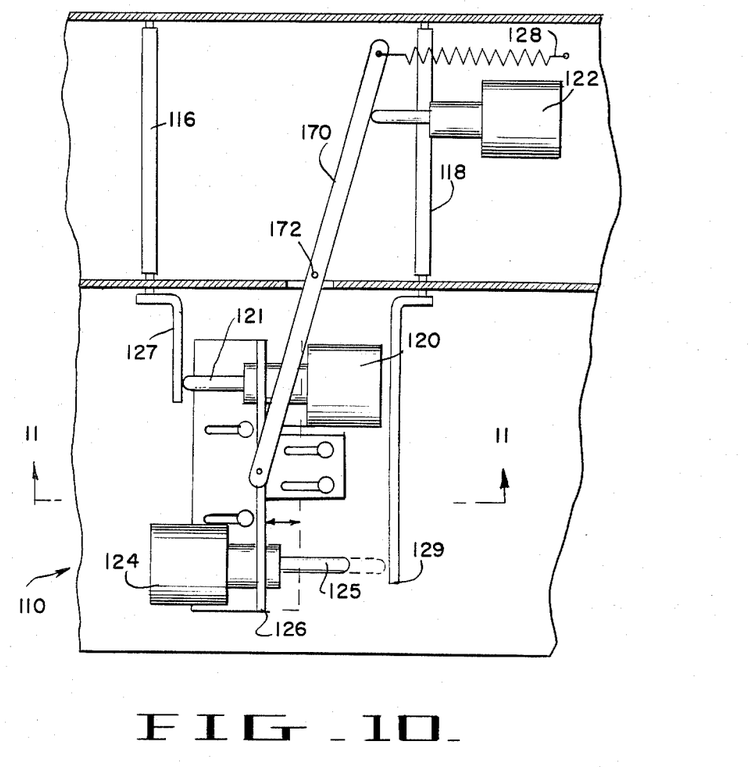
FIG. 10 is a top view of another diffuser of the present invention, showing the thermal sensor actuators.
Figure 11:
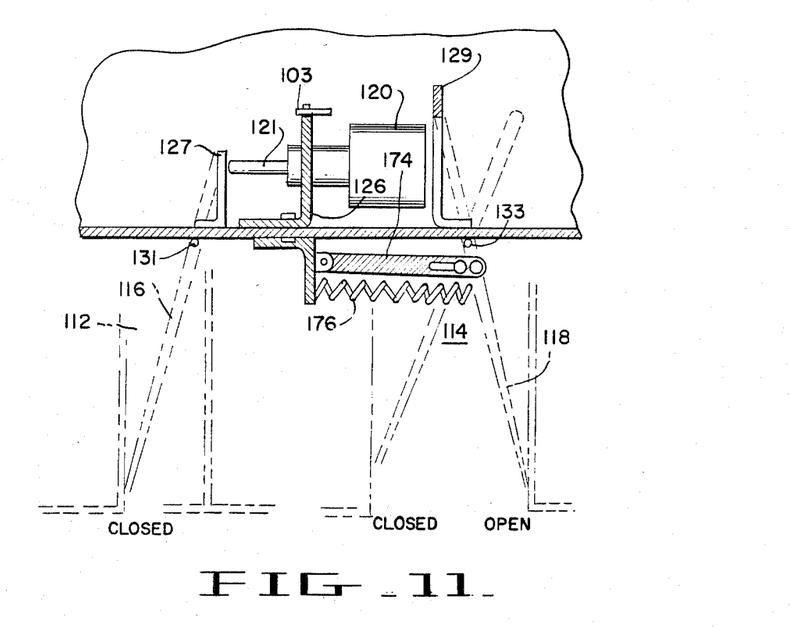
FIG. 11 is a schematic side view of a slot diffuser in which the thermal sensor actuators disclosed in FIG. 10 are positioned.

Referring to FIG. 10, there is shown yet another slot diffuser 110 of the present invention. This slot or linear diffuser 110 is similar to the slot diffuser 70 shown and described in FIGS. 6-9. The slot diffuser 110 comprises a first slot 112 and a second slot 114 with a first blade 116 regulating the flow of air through the first slot 112 and a second blade 118 regulating the flow of air through the second slot 114. In this diffuser 110 of the present invention, however, the first and second blades 116 and 118 are not connected in tandem. Air of one temperature, such as cool air, is supplied through the first slot 112, while air of another temperature, such as warm air, is supplied through the second slot 114.

A first thermal sensor actuator 120 is mounted on a bar 126. The first thermal sensor actuator 120 has a shaft 121 which is aligned to impinge against a first tab 127. The first tab 127 turns a first rod 131 which moves the first blade 116 when the bar 126 is in one position. A third thermal sensor actuator 124 is also mounted on the bar 126. The third thermal sensor actuator 124 has a shaft 125, which is aligned to impinge a second tab 129. The second tab 129 rotates a second rod 133 which moves the second blade 118 when the bar 126 is in a second position. The bar 126 is adapted to move between a first position and a second position by the second thermal sensor actuator 122 acting through a lever 170 and a pin 172.

COOLING MODE

In the operation of the slot diffuser 110 of the present invention, during the cooling mode, cool air is supplied from the duct. The second thermal sensor actuator 122 is retracted. A spring 128 brings the bar 126 into the first position. In the first position of the bar 126, the first thermal sensor actuator 120 is aligned to modulate the opening of the first blade 116 from a normally closed position to an open position. When the room air temperature warms up, the shaft 121 of the first thermal sensor actuator 120 begins to expand, pushing against the first tab 127, rotating the first rod 131 which moves the first blade 116. This forces the first slot 112 to an open position bringing cool air into the room.

In the first position of the bar 126, the link 174 pulls the second blade into the closed position. Thus, no duct air enters into the room through the second slot 114.

HEATING MODE

In the heating mode, warm air is supplied through the duct. This causes the second thermal sensor actuator 122 to push against the lever 170 which moves the bar 126 into the second position. In the second position of the bar 126, the first sensor actuator 120 is disengaged from the first blade 116 which remains in a position to close the flow of air through the first slot 112.

When the bar 126 is moved into the second position, the spring 176 pushes against the second blade 118, pushing it into a position to open the flow of air through the second slot 114. The third sensor actuator 124 is then aligned to modulate the second tab 129 which is positioned to move the second blade 118. The third thermal sensor actuator 124 is aligned to modulate the blade 118 such that the slot 114 operates from a normally open position to a closed position. In this mode of operation, when the room air temperature warms up to the desired temperature, the shaft 125 of the third thermal sensor actuator 124 expands, pushing against the second tab 129 moving the second blade 118 thereby closing the second slot 114.

With the slot diffuser 110, it can be seen that cool air is introduced into the room in one slot 112 while warm air is introduced into the room in the other slot 114.

Figure 12:
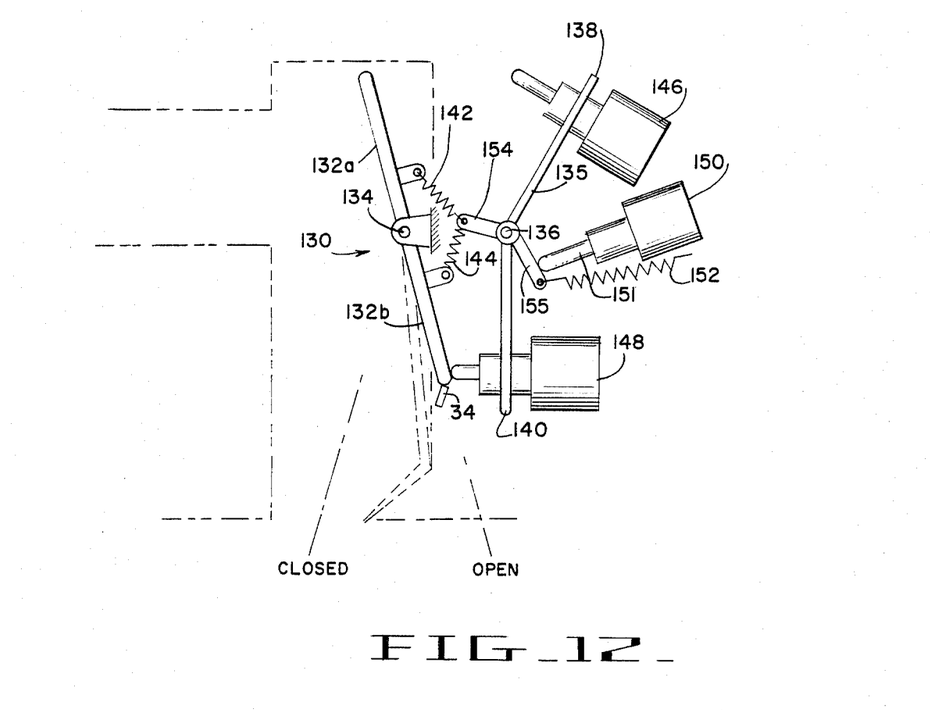
FIGS. 12-13 are schematic top views of another thermal assembly suitable for use in the diffuser of the present invention.
Figure 13:
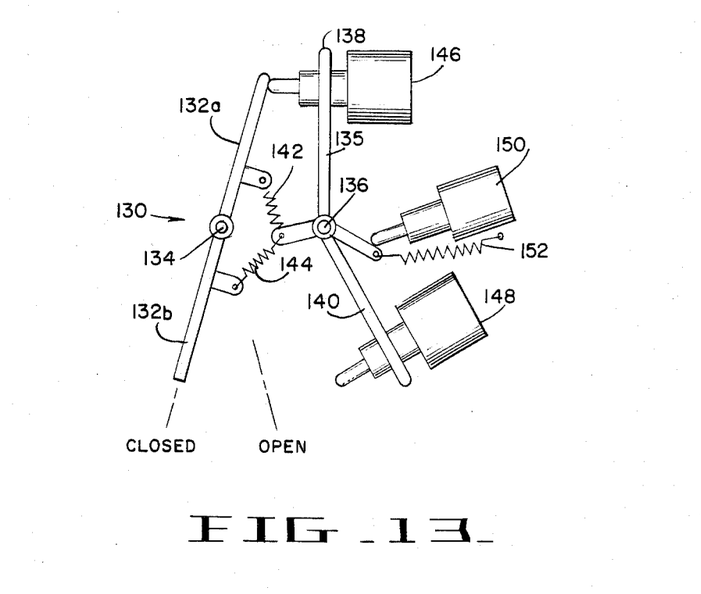

Referring to FIGS. 12–13, there is shown another embodiment of a thermal assembly 130 for use in a diffuser of the present invention. In the assembly 130, a control bar 132 is pivotally mounted about a first axis 134. The control bar 132 can be used to control the opening 160 as shown in FIG. 12. An arm 135 is pivotally mounted at a second axis 136, spaced apart from the first axis 134. The arm 135 has a first lineal member 138 to one side of the second axis 136 and a second lineal member 140 to the other side of the second axis 136. A first thermal sensor actuator 146 is mounted on the first lineal arm 138, while a third thermal sensor actuator 148 is mounted on the second lineal arm 140. A tab 154 is also pivotally mounted at the second axis 136. A second spring 142 is connected between the upper bar 132a and the tab 154. A third spring 144 is connected between the lower bar 132b and the tab 154. A second thermal sensor actuator 150 is positioned to move the second lineal arm 140 thru a second tab 155 on second axis 136. A first spring 152, however, biases the second tab 155 against the shaft 151 of the second thermal sensor actuator 150.

The first and third thermal sensor actuators 146 and 148, respectively, respond to changes in the room air temperature while the second thermal sensor actuator 150 being located in the diffuser box is responsive to changes in the duct air temperature.

COOLING MODE

In the cooling mode, the second thermal sensor actuator 150 is fully retracted as cold air is supplied through the duct. This is shown in FIG. 13. The first spring 152 retracts the second lineal member 140, causing the first thermal sensor actuator 146 to engage the upper bar 132a of the control arm 132. A second spring 142 pulls the upper bar 132a and the control bar 132 into the closed position. As the room air temperature warms up, the first thermal sensor actuator 146 expands. The first thermal sensor actuator 146 then pushes against the upper bar 132a, moving the control arm 132 to the open position. This permits cool air to enter into the room. When the temperature is satisfied, the first thermal sensor actuator 146 retracts. The second spring 142 brings the upper bar 132a back to the closed position.

HEATING MODE

In the heating mode, warm air is supplied through the duct. This causes the second thermal sensor actuator 150 to expand. The effect of the second thermal sensor actuator 150 pushing against the second tab 155 rotates the second lineal member 140 causing the third thermal sensor actuator 148 to move into engagement relationship with the lower bar 132b of the control bar 132. The third spring 144 brings the lower bar 132b into the open position as shown in FIG. 12. The control bar 132 now positions the louvers in the "open" position. When the room air temperature has reached the desired temperature as set by the third thermal sensor actuator 148, the third thermal sensor actuator 148 begins to expand pushing the lower bar 132b to the closed position. This closes off the louvers and prevents further warm air from entering into the room.

There are many advantages to the apparatus of the present invention. First and foremost is that with two thermal sensor actuators, two different temperature settings can be made. For example, in the winter when warm air is supplied through the duct, one of the thermal sensor actuators can be set to respond (by closing the flow of air) at, for example, 68° F. In the summer, when cool air is supplied through the duct, the other thermal sensor actuator can be set to respond (by opening the flow of air) at, for example, 78° F. This flexibility in temperature settings results in energy conservation. In addition, the disengagement and engagement of one or the other thermal sensor actuator by a thermal sensor actuator in the duct, assures that one thermal sensor actuator is operational over only one temperature range. Finally, in one embodiment of a linear diffuser, the slot for heat is not engaged during cooling and visa-versa, which would otherwise occur with room temperature fluctuation and stratification.

We claim:

1. In a diffuser of the type for regulating the flow of air from a duct or other source to a room or other space including air flow control means for varying the size of an opening in said diffuser to regulate the flow of air, first sensor-actuator means responsive to room air temperature and operatively associated with said flow control means for modulating said flow control means, and second sensor-actuator means responsive to air duct temperature, wherein the improvement in said diffuser comprises:

third sensor-actuator means responsive to room air temperature and operatively associated with said flow control means for modulating said flow control means; and said second sensor-actuator means being further formed to disassociate at least one of said first sensor-actuator means and said third sensor-actuator means from said flow control means in response to air duct temperature present in said duct to thereby control the flow of air from said diffuser.

2. The diffuser as defined in claim 1 wherein,
   said second sensor-actuator means is formed to disassociate only one of said first sensor-actuator means and said third sensor-actuator means from, and to associate a remainder of said first sensor-actuator means and said third sensor-actuator means with, said flow control means in response to air duct temperature which is at least equal to a predetermined air duct temperature; and
   said second sensor-actuator means is formed to disassociate a remainder of said first sensor-actuator means and said third sensor-actuator means from, and to associate said one of said first sensor-actuator means and said third sensor-actuator means with, said flow control means in response to an air duct temperature which is below said predetermined air duct temperature.

3. The diffuser as defined in claim 1 wherein,
   said second sensor-actuator means is further responsive to a change in said air duct temperature to associate a disassociated one of said first sensor-actuator means and said third sensor-actuator means and to disassociate the remainder of said first sensor-actuator means and said third sensor-actuator means.

4. The diffuser as defined in claim 1 wherein,
   said second sensor-actuator means is a single sensor-actuator element coupled to associate one and disassociate another of said first sensor-actuator means and said third sensor-actuator means in response to air duct temperature to determine which of said first sensor-actuator means and said third sensor-actuator means modulates said flow control means.

5. A diffuser for regulating the volume of flow of air from a duct to a room or other space, comprising:
   flow control means for varying the size of an opening in the diffuser to regulate the volume flow of air from the duct through the diffuser and into the room or other space;
   first sensor actuator means responsive to a first room air temperature and operatively associated with the flow control means to commence modulating the flow control means in response to changes in room temperature when air of one temperature is supplied through the duct;
   second sensor actuator means responsive to the duct air temperature;
   third sensor actuator means responsive to a second room air temperature and operatively associated with the flow control means to commence modulating the flow control means in response to changes in room temperature when air of another temperature is supplied through the duct;
   said second sensor actuator means formed to associate said first sensor actuator means with said flow control means and formed to disassociate said third sensor actuator means with said flow control means when air of one temperature is supplied through the duct; and
   said second sensor actuator means formed to associate said third sensor actuator means with said flow control means and formed to disassociate said first sensor actuator means with said flow control means when air of said another temperature is supplied through the duct.

6. The diffuser of claim 5, wherein
   said first sensor actuator means is formed for modulating the flow control means from a normally closed to open mode of operation; and
   said third sensor actuator means is formed for modulating the flow control means from a normally open to closed mode of operation.

7. The diffuser of claim 6, wherein
   said first room air temperature is warmer than said second room air temperature; and
   said one temperature is cooler than said another temperature.

8. The diffuser of claim 7, wherein said flow control means further comprises:
   a first blade for modulating the flow of air through a first slot; and
   a second blade for modulating the flow of air through a second slot.

9. The diffuser of claim 8, wherein
   said first sensor actuator means is operatively associated with said first blade; and
   said third sensor actuator means is operatively associated with said second blade.

10. The diffuser of claim 8, wherein said first blade and said second blade are connected to move in tandem.

11. The diffuser of claim 10, wherein said first and third sensor actuator means are operatively associated with said first and second blades.

12. A diffuser of a kind used to regulate the volume of flow of air from a duct to a room or other space, comprising:
    flow control means for varying the size of an opening in the diffuser to regulate the volume flow of air from the duct through the diffuser and into the room or other space;
    first sensor actuator means responsive to a first room air temperature and operatively associated with the flow control means for modulating the flow control means in a normally closed to open mode of operation in response to changes in room air temperature when air of one temperature is supplied through the duct;
    second sensor actuator means responsive to duct air temperature and operatively associated with the flow control means for moving the flow control means to an open position in response to air of another temperature in the duct; said another temperature higher than said one temperature;

said second sensor actuator means being further formed for disassociating said first sensor actuator means from said flow control means in response to air of another temperature in the duct; and third sensor actuator means responsive to a second room air temperature and operatively associated with the flow control means for modulating the flow control means from a normally open to closed mode of operation in response to changes in room air temperature when air of another temperature is supplied through the duct.

13. The diffuser of claim 12, wherein said flow control means including a movable diffuser plate and a sleeve mounted for movement in the diffuser plate and a shaft mounted for movement within the sleeve; and wherein said first sensor actuator means being connected to move the sleeve, said second sensor actuator means being connected to move the shaft, and said third sensor actuator means being positioned to move the diffuser plate.

14. The diffuser of claim 12, wherein said flow control means further comprises a blade actuator arm pivotally mounted for modulating the opening of said diffuser;

a bar having two lineal members;

said first sensor actuator mounted on one of said members;

said third sensor actuator mounted on other of said members;

said bar pivotally mounted spaced apart from said blade actuator arm; and said second sensor actuator being positioned to move said bar such that said first sensor actuator is engaging said blade actuator arm when air of one temperature is supplied through the duct and said third sensor actuator is engaging said blade actuator arm when air of another temperature is supplied through the duct.

* * * * *

UNITED STATES PATENT AND TRADEMARK OFFICE
CERTIFICATE OF CORRECTION

PATENT NO.  : 4,523,713
DATED       : June 18, 1985
INVENTOR(S) : James R. Kline and Peter Brand It is certified that error appears in the above-identified patent and that said Letters Patent is hereby corrected as shown below:

Column 5, line 48, delete "modulated" and insert

---modulates---.

IN THE ABSTRACT:

Line 10, delete "second" and insert ---third---.

Signed and Sealed this

Twenty-second Day of October 1985

[SEAL]

Attest:

DONALD J. QUIGG

Attesting Officer

Commissioner of Patents and
Trademarks—Designate